US010167923B2

(12) United States Patent
Suchta et al.

(10) Patent No.: US 10,167,923 B2
(45) Date of Patent: Jan. 1, 2019

(54) HYDRAULIC POWERTRAIN MOUNT WITH DUAL LOW FREQUENCY INERTIA TRACKS AND DECOUPLING MEMBRANE WITH SYNCHRONOUS SWITCHING MECHANIZATION

(71) Applicant: GM GLOBAL TECHNOLOGY OPERATIONS LLC, Detroit, MI (US)

(72) Inventors: Wojciech E. Suchta, Richmond Hill (CA); Sam M. Jomaa, Northville, MI (US); Daniel G. Gannon, Milford, MI (US); Craig W. Lewitzke, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 259 days.

(21) Appl. No.: 15/212,567

(22) Filed: Jul. 18, 2016

(65) Prior Publication Data

US 2018/0017130 A1    Jan. 18, 2018

(51) Int. Cl.
*F16F 13/26* (2006.01)
*B60K 1/00* (2006.01)
*B60K 5/12* (2006.01)
*F16F 13/10* (2006.01)

(52) U.S. Cl.
CPC .............. *F16F 13/266* (2013.01); *B60K 1/00* (2013.01); *B60K 5/1208* (2013.01); *F16F 13/10* (2013.01)

(58) Field of Classification Search
CPC .......... F16F 13/266; F16F 13/10; B60K 1/00; B60K 5/1208
USPC .............. 267/140.14, 140.11, 140.12–140.15
See application file for complete search history.

(56) References Cited

U.S. PATENT DOCUMENTS

| 8,517,359 | B2* | 8/2013 | Graeve | F16F 13/262 267/140.13 |
| 9,895,965 | B2* | 2/2018 | Mathai | B60K 5/1283 |
| 2010/0096789 | A1* | 4/2010 | Gannon | B60K 5/1266 267/140.15 |
| 2017/0113534 | A1* | 4/2017 | Mathai | B60K 5/04 |

\* cited by examiner

*Primary Examiner* — Vishal R Sahni
(74) *Attorney, Agent, or Firm* — Quinn IP Law

(57) ABSTRACT

A vehicle powertrain mount includes a housing and first and second compliant members coupled to and cooperating with the housing. An inertia track assembly cooperates with the first compliant member to form a first fluid chamber and second fluid chamber with the second compliant member. The inertia track assembly includes at least first and second channels for conducting fluid between the first fluid chamber and the second fluid chamber. An air chamber in the inertia track assembly cooperates with a decoupler disposed therein. A switching apparatus is operatively connected to the housing and selectively positionable relative to the inertia track assembly. The switching apparatus includes an actuator with a plunger having a first portion positionable relative to the second channel and a second portion synchronously positionable relative to the air chamber.

18 Claims, 5 Drawing Sheets

HYDRAULIC POWERTRAIN MOUNT WITH DUAL LOW FREQUENCY INERTIA TRACKS AND DECOUPLING MEMBRANE WITH SYNCHRONOUS SWITCHING MECHANIZATION

TECHNICAL FIELD

The present disclosure relates generally to powertrain mounts and, more particularly, to a hydraulic powertrain mount utilizing one fixed and one switchable low frequency inertia tracks and a switchable decoupler utilizing one actuator.

BACKGROUND

Conventional elastomeric powertrain mounting systems generally provide propulsion system isolation and control propulsion system motion. One common type of powertrain mount is an elastomeric powertrain mount that can provide constant dynamic properties across a range of frequencies. The level of damping is generally increased or decreased by preselecting an elastomeric material having different properties and/or dimensions. Once constructed, set damping rate characteristics are provided regardless of the actual operating conditions encountered by the mount.

Hydraulic mounts were developed, in part, due to the desirability of providing a mount having a high damping coefficient with a single specified peak frequency for relatively high amplitude inputs and a relatively low damping coefficient for lower amplitude inputs. Mount dynamic stiffness and damping performance are determined by characteristics such as, for example, pumping chamber geometry, chamber wall material, and orifice track properties. Additional improvement in the performance characteristics of hydraulic mounts at selected frequency ranges were achieved by employing electronic control of the dynamic characteristics of the mount. This provided a preprogrammed ability to change the response of the mount to optimize dynamic performance.

SUMMARY

A vehicle powertrain mount includes a housing and first and second compliant members coupled to and cooperating with the housing. An inertia track assembly cooperates with the first compliant member to form a first fluid chamber and second fluid chamber with the second compliant member. The inertia track assembly includes at least first and second channels of different lengths for conducting fluid between the first fluid chamber and the second fluid chamber, wherein the inertia track assembly forms an air chamber having a first end and a second end in communication with a port vented to the atmosphere. A decoupler is disposed in and cooperates with the first end of the air chamber. A switching apparatus is operatively connected to the housing and selectively positionable relative to the inertia track assembly. The switching apparatus includes an actuator with a plunger movable to synchronously open or close the second channel and air chamber of the inertia track assembly.

The plunger may include a first portion positionable relative to the second channel and a second portion positionable relative to the air chamber, wherein the first portion and second portion are synchronously movable between a first position and a second position. In one embodiment of the disclosure, the first and second portions of the plunger are synchronously movable between the first position wherein the first portion is moved away from the second channel to open the second channel and the second portion is moved away from the air chamber to open the air chamber and unlock the decoupler and the second position wherein the first portion closes the second channel and the second portion closes the air chamber to lock the decoupler.

In another embodiment of the disclosure, the second portion of the plunger includes a projection extending from the plunger disposed within and adjustable relative to an opening in the air chamber. The first portion and projection of the second portion of the plunger are synchronously movable between the first position wherein the first portion is moved away from the second channel to open the second channel and the member of the second portion closes the air chamber to lock the decoupler and the second position wherein the first portion closes the second channel and the member of the second portion moves to open the air chamber and unlock the decoupler.

The switching apparatus may include a controller in communication with the actuator to instruct the simultaneous and selective positioning of the first portion and the second portion of the plunger between the first position or the second position. The powertrain mount housing may include a first end that cooperates with and receives the first compliant member such that the first compliant member receives a propulsion system attachment assembly and a second end that cooperates with the second compliant member and the second end is coupled to a vehicle structure. The first and second channels in the inertia track assembly may be formed as part of a single channel extending through the inertia track assembly. The second fluid channel is shorter than the first fluid channel.

In yet another embodiment of the disclosure, a powertrain mount for a vehicle comprises a housing with first and second compliant members coupled to and cooperating with the housing. An inertia track assembly is disposed within the housing forming a first fluid chamber with the first compliant member and forming a second fluid chamber with the second compliant member. The inertia track assembly includes at least first and second channels extending through the inertia track assembly for conducting fluid between the first fluid chamber and the second fluid chamber, wherein the inertia track assembly forms an air chamber having a first end and a second end in communication with a port.

A decoupler is disposed in and cooperates with the first end of the air chamber. A switching apparatus is operatively connected to the housing and selectively positionable relative to the inertia track assembly. The switching apparatus includes an actuator and a plunger movable to synchronously open or close the second channel and air chamber of the inertia track assembly.

The plunger includes a first portion positionable relative to the second channel and a second portion positionable relative to the air chamber, wherein the first portion and second portion are synchronously movable between a first position or a second position to open or close the second channel and air chamber of the inertia track assembly. The first and second portions of the plunger are synchronously movable between the first position wherein the first portion is moved away from the second channel to open the second channel and the second portion is moved away from the air chamber to open the air chamber and unlock the decoupler and the second position wherein the first portion closes the second channel and the second portion closes the air chamber to lock the decoupler.

The switching apparatus may include a controller in communication with the actuator to instruct the simultaneous and selective positioning of the first portion and the second portion of the plunger between the first position or the second position. The powertrain mount housing may include a first end that cooperates with and receives the first compliant member such that the first compliant member receives a propulsion system attachment assembly and a second end that cooperates with the second compliant member and the second end is coupled to a vehicle structure. The first and second channels in the inertia track assembly may be formed as part of a single channel extending through the inertia track assembly. The second fluid channel is shorter than the first fluid channel.

In another embodiment of the disclosure, a powertrain mount for a vehicle comprises a housing with first and second compliant members coupled to and cooperating with the housing. An inertia track assembly is disposed within the housing forming a first fluid chamber with the first compliant member and forming a second fluid chamber with the second compliant member. The inertia track assembly includes at least first and second channels of different lengths extending through the inertia track assembly for conducting fluid between the first fluid chamber and the second fluid chamber, wherein the inertia track assembly forms an air chamber having a first end and a second end in communication with a port.

A decoupler is disposed in and cooperates with the first end of the air chamber. A switching apparatus is operatively connected to the housing and selectively positionable relative to the inertia track assembly. The switching apparatus includes an actuator and plunger movable to synchronously open or close the second channel and air chamber of the inertia track assembly.

The plunger includes a first portion positionable relative to the second channel and a second portion having a projection extending from the plunger to be disposed within and adjustable relative to an opening in the air chamber, wherein the first portion and second portion are synchronously movable between a first position or a second position to open or close the second channel and air chamber of the inertia track assembly. The second portion of the plunger includes a member disposed within and adjustable relative to an opening in the air chamber. The first portion and projection of the second portion of the plunger are synchronously movable between the first position wherein the first portion is moved away from the second channel to open the second channel and the member of the second portion closes the air chamber to lock the decoupler and the second position wherein the first portion closes the second channel and the member of the second portion moves within the air chamber to open the air chamber and unlock the decoupler.

The switching apparatus may include a controller in communication with the actuator to instruct the simultaneous and selective positioning of the first portion and the second portion of the plunger between the first position or the second position. The first and second channels in the inertia track assembly may be formed as part of a single channel extending through the inertia track assembly. The second fluid channel is shorter than the first fluid channel.

The above noted and other features and advantages of the present disclosure are readily apparent from the following detailed description when taken in connection with the accompanying drawings.

DETAILED DESCRIPTION

Figure 1:
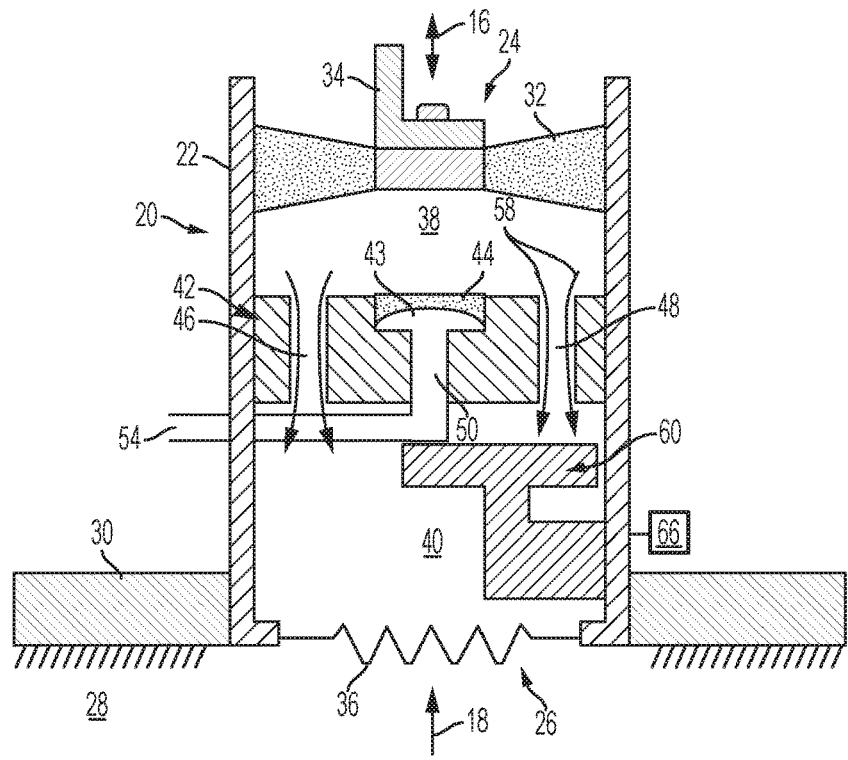
FIG. 1 is a schematic cross-sectional diagram of a switchable powertrain mount for a vehicle in accordance with a first exemplary embodiment of the disclosure.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring now to the drawings, wherein like reference numbers correspond to like or similar components throughout the several figures, FIG. 1 illustrates a schematic cross-sectional diagram of a powertrain mount including switchable powertrain mount 20 for use with a propulsion system in accordance with an exemplary embodiment of the disclosure. The propulsion system may be any of an internal combustion engine, fuel cells, motors and the like.

The propulsion system may be part of a vehicle may include a motorized vehicle, such as, but not limited to, standard passenger cars, sport utility vehicles, light trucks, heavy duty vehicles, minivans, buses, transit vehicles, bicycles, robots, farm implements, sports-related equipment or any other transportation apparatus. For purposes of clarity, the switchable powertrain mount will hereinafter be referred to as a powertrain mount.

FIGS. 1-4 illustrate a first embodiment of the switchable powertrain mount of the present disclosure. Powertrain mount 20 may include a housing 22 having a first end 24 and a corresponding second end 26. The powertrain mount housing 22 may be fixedly coupled at the second end to a vehicle structure 28 of a vehicle by a mounting structure 30 in accordance with known techniques.

A first compliant member 32 may be disposed within and generally enclose a first end 24 of the powertrain mount housing 22. The first compliant member 32 is coupled to a propulsion system attachment assembly 34. In one embodiment of the disclosure, the first compliant member 32 may be resilient and formed of an elastomeric material such as rubber or the like. For purposes of illustration, relative motion between the structure 28 of the vehicle and propulsion system attachment assembly 34 is indicated by arrow 16.

The second end 26 of powertrain mount 20 may include a second compliant member or bellows 36 coupled to the second end 26 of mount 20. Second compliant member 36 may be exposed to a first source of pressure, such as atmospheric pressure, as indicated by arrow 18. Powertrain mount 20 may further include a first or upper fluid chamber 38 and an opposing second or lower fluid chamber 40 in fluid communication with the first fluid chamber 38 through an inertia track assembly 42 coupled to the powertrain mount housing 22. The first fluid chamber 38 and second fluid chamber 40 may be filled with a fluid or liquid based material, including, but not limited to, liquid glycol or the like.

As is shown in the FIGS. 1-4, the first end 24 of the housing 22 is disposed on an upper portion of the housing 22 and cooperates to receive the first compliant member 32. The first compliant member 32 receives the propulsion system attachment assembly 34 while the opposing second end 26 of the housing 22 is disposed on a lower portion of the housing 22 to cooperate with the second compliant member 36 and to secure the housing 22 to the vehicle structure 28. However, it is understood that the first compliant member 32 of the powertrain mount 20 may be configured to be coupled to the vehicle structure 28 while the housing 22 of the powertrain mount 20 receives the propulsion system attachment assembly 34.

A compliant membrane or resilient decoupler 44 may be provided proximate to and cooperate with the inertia track assembly 42. It is understood that the decoupler 44 may be floating or fixed as is shown in the Figures wherein the decoupler 44 is either fixed on the outer perimeter or may be fixed both to the outer perimeter and an inner perimeter. An air pocket 43 may be incorporated with and defined by the decoupler 44.

A first fluid track or channel 46 and a second fluid track or channel 48 may be formed in and extend through the inertia track assembly 42. First or upper fluid chamber 38 and second or lower fluid chamber 40 may be fluidly coupled together by the inertia track assembly 42 through the first fluid channel 46 and the second fluid channel 48. It is contemplated that the second fluid channel 48 may be shorter than the first fluid channel 46.

Figure 2:
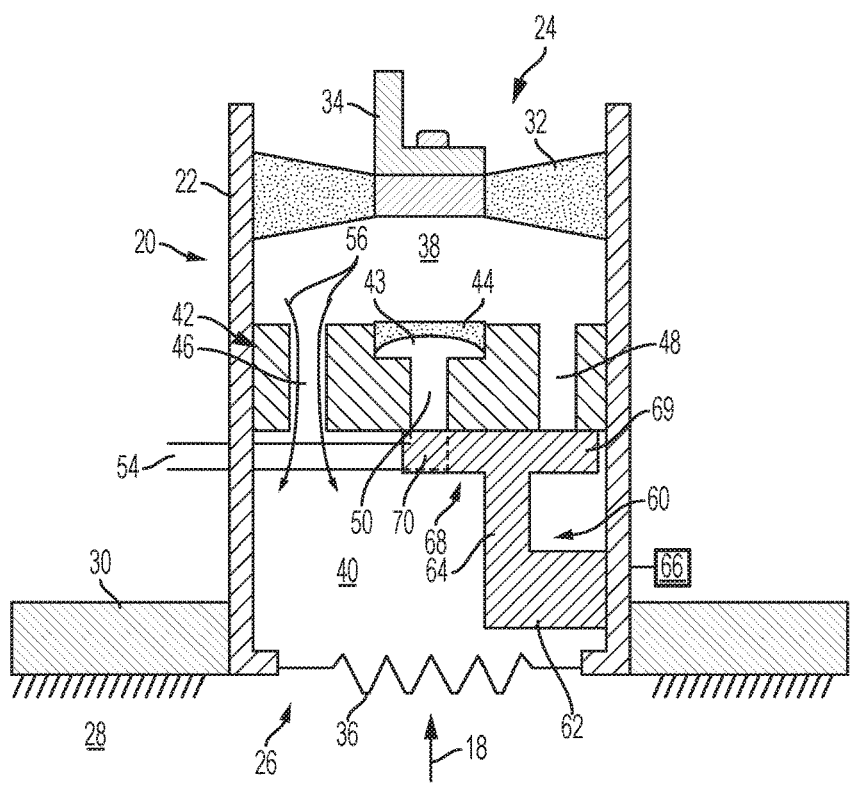
FIG. 2 is a schematic cross-sectional diagram of the first embodiment of the switchable powertrain mount including a switching apparatus shown in an energized position.
Figure 3:
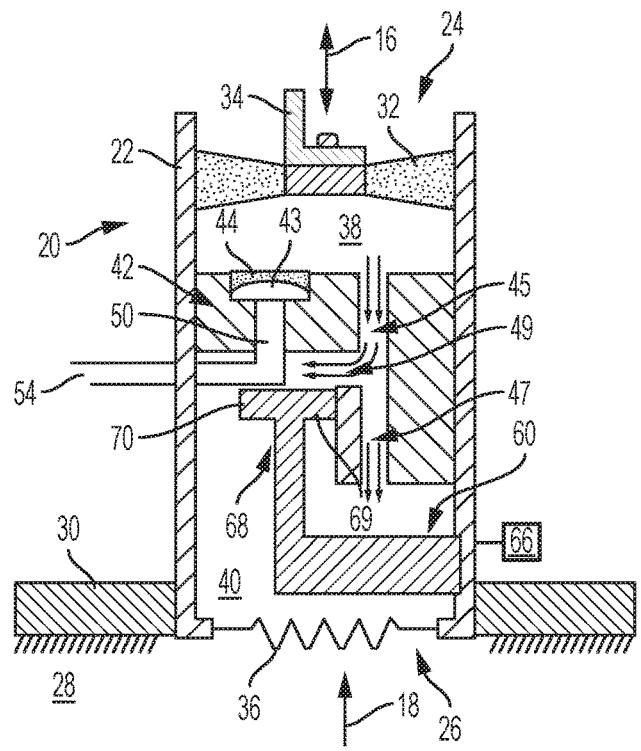
FIG. 3 is a schematic cross-sectional diagram of a switchable powertrain mount for a vehicle illustrating an alternative channel arrangement for use with the first exemplary embodiment of the disclosure.
Figure 4:
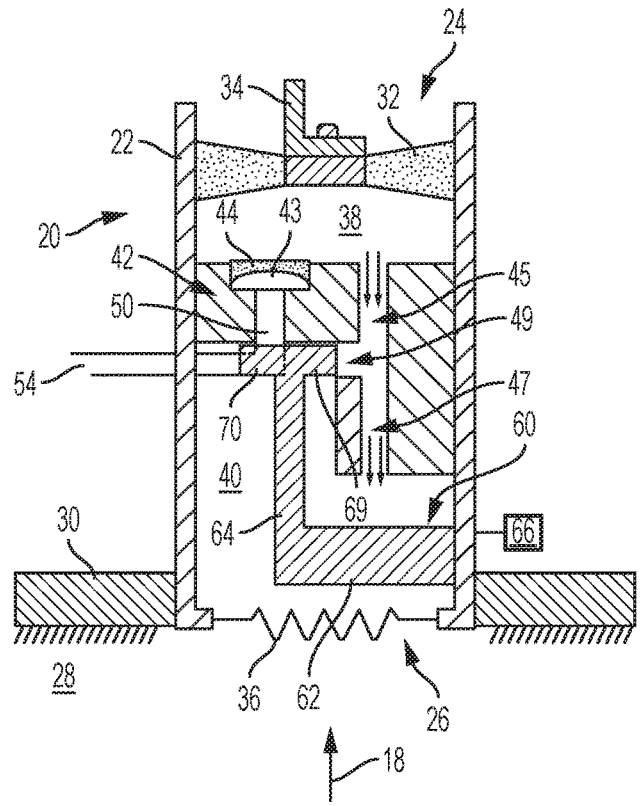
FIG. 4 is a schematic cross-sectional diagram of the switchable powertrain mount with the alternative channel arrangement of the first exemplary embodiment having a switching apparatus shown in an energized position.

FIGS. 1 and 2 illustrate a first mechanization of the powertrain mount, wherein the first channel 46 and second channel 48 are formed as discrete channels within the inertia track assembly 42. Alternatively, FIGS. 3 and 4 illustrate the first mechanization of the powertrain mount with an option to provide a single channel in the inertia track assembly 42 with two channel exits. The first channel 47 and second channel 49 shown in FIGS. 3 and 4 are formed as discrete exit portions of a single channel 45 extending through the inertia track assembly 42.

In this embodiment, the first channel 47 is defined by the length from the interconnection between the single channel 45 and inlet opening of the first channel 47 to the outlet of the first channel 47 while the second channel 49 is defined by the length from the interconnection between the single channel 45 and inlet opening of the second channel 49 to the outlet of the first channel 47. As with the first and second channels 46, 48 of FIGS. 1 and 2, it is contemplated that the first channel 47 is longer than the second channel 49.

The first channel 46 may be formed or tuned with one or more defined parameters including, but not limited to, the cross-section, length, surface friction and/or geometry to support the unique low frequency damping requirements for the first channel 46 of the powertrain mount 20. Low frequency damping events may include propulsion system or engine ignition events wherein the desired damping frequency may be between about 7 Hertz (Hz) to about 9 Hz. The second channel 48 may be formed or tuned with one or more defined parameters including, but not limited to, the cross-section, length, surface friction and/or geometry. The first channel 46, in combination with the second channel 48, supports the unique low frequency ride events when the desired damping frequency may be between about 10 Hz to about 12 Hz. It is appreciated that the first and second channels 47, 49 of the alternative arrangement may each be formed and tuned to achieve the unique required damping characteristics for each of the channels 47, 49 and provide similar functions and results as the first and second channels 46, 48 of powertrain mount 20.

An air chamber 50 includes a first or upper end and a second or lower end and is formed within the inertia track assembly 42. It is contemplated that air chamber 50 cooperates with the resilient decoupler 44 disposed therein and is configured to permit the decoupler 44 to be adjustably positionable or selectively assume one or more positions. In one embodiment of the disclosure, resilient decoupler 44 may be positioned on the inertia track assembly 42 and exposed to the first fluid chamber 38. Decoupler 44 may be adjustably positioned or capable of selectively assuming a first or stationary position enabling direct fluid displacement between the first fluid chamber 38 and the second fluid chamber 40 through at least one of the first and second fluid channels 46, 48. Alternatively, decoupler 44 may be moved to at least one second or moveable position that causes volumetric dilation of the first fluid chamber 38 that hinders fluid displacement, generally referenced by number 58, through the first and second fluid channels 46, 48.

A port 54 extends through powertrain mount housing 22 and is in communication with the air chamber 50 to allow air to flow into to the air chamber 50. In one embodiment of the disclosure, powertrain mount 20 is movable in response to propulsion system or road excitation, such that fluid is pushed by first compliant member 32 from the first fluid chamber 38 to the second fluid chamber 40. It is understood that the degree of dynamic stiffness and damping of powertrain mount 20 depends, in part, on the ease with which the fluid flows between the first fluid chamber 38 and the second fluid chamber 40 and the masses of fluid in the first fluid channel 46 and second fluid channel 48.

The fluid in first fluid channel 46 or second fluid channel 48 may resonate in a frequency dependent upon the volumetric dilation of the chambers, and fluid volumetric displacements based on such properties as the mass of fluid in the channels and elasticity of first compliant member 32 and second compliant member 36. Since ease of flow through first fluid channel 46 and second fluid channel 48 depends on channel length, cross-section, surface friction, and fluid entry and exit area constrictions and refractions, the channels 46, 48 can also be tuned to provide a differential resistance to flow.

Powertrain mount 20 may be configured to provide multiple levels of dynamic stiffness and damping using the switchable powertrain mount as will be described in greater detail below. A switching apparatus 60 may cooperate with two switchable low frequency inertia tracks or channels 46, 48 in the inertia track assembly 42 and the decoupler 44 synchronously. For purposes of this disclosure, low frequency may represent a frequency of no greater than 15 Hz as represented by lines 76 in FIG. 7B and 96 in FIG. 8B.

As will be described in greater detail below, the switching apparatus 60 may close the second fluid channel 48 to force fluid flow through the first channel 46. Further, the switching apparatus may selectively lock or unlock the decoupler 44 by restricting air flow into the air chamber 50. Switching apparatus 60 enables the powertrain mount 20 to create two distinct damping peaks at different frequencies that can be independently switched on or off and can be independently tuned for ignition and ride events.

In a first embodiment of the disclosure, powertrain mount 20 includes a switching apparatus 60 operatively connected to the housing 22 and selectively positionable relative to the inertia track assembly 42. The switching apparatus 60 may be disposed in the powertrain mount 20 between the first compliant member 32 and the second compliant member 36. Switching apparatus 60 may include a housing 62 having an actuator 64 extending therefrom. Alternatively, the actuator 64 may be disposed within or adjacent the powertrain mount housing 22.

The actuator 64 includes a plunger 68 that may be movable between a first position or non-energized state as shown in FIGS. 1 and 3 and a second position or energized state as shown in FIGS. 2 and 4. The actuator 64 as shown in the Figures illustrates the actuator 64 as a solenoid type electrical actuator internal to the powertrain mount 20. However, the actuator 64 may be disposed either internally within or external to the powertrain mount 20.

Figure 5:
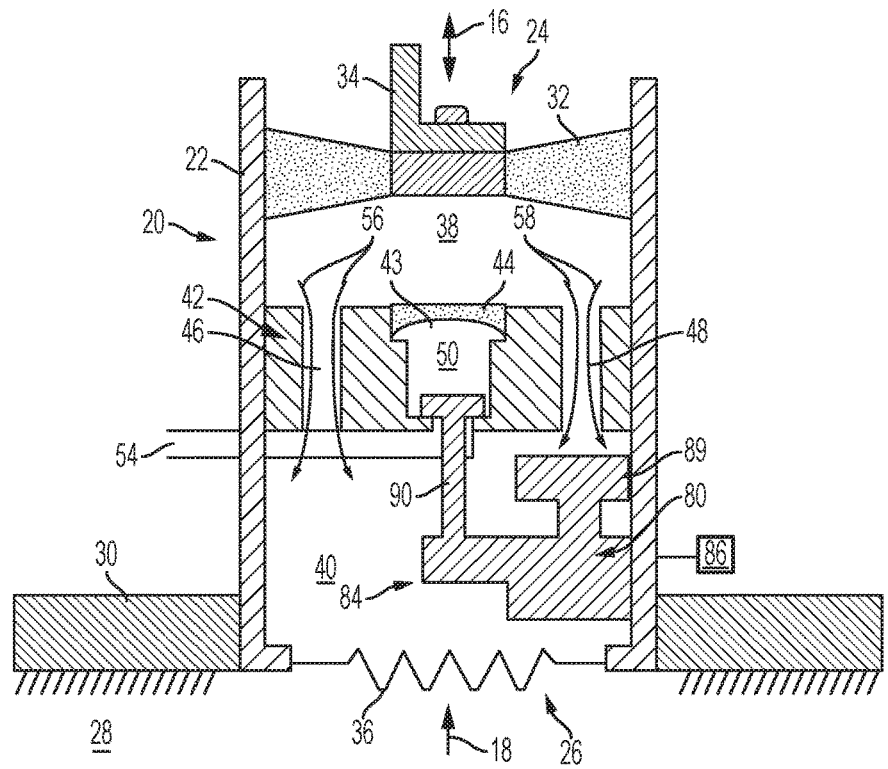
FIG. 5 is a schematic cross-sectional diagram of a switchable powertrain mount for a vehicle in accordance with a second exemplary embodiment of the disclosure.
Figure 6:
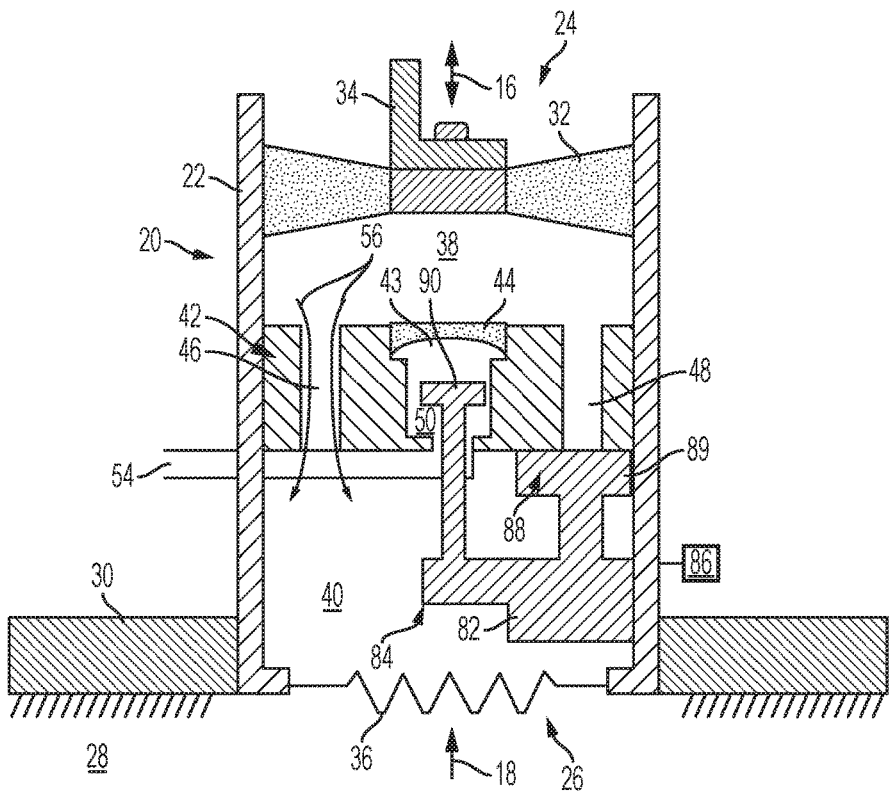
FIG. 6 is a schematic cross-sectional diagram of the second embodiment of the switchable powertrain mount including a switching apparatus shown in an energized position.
Figure 7A:
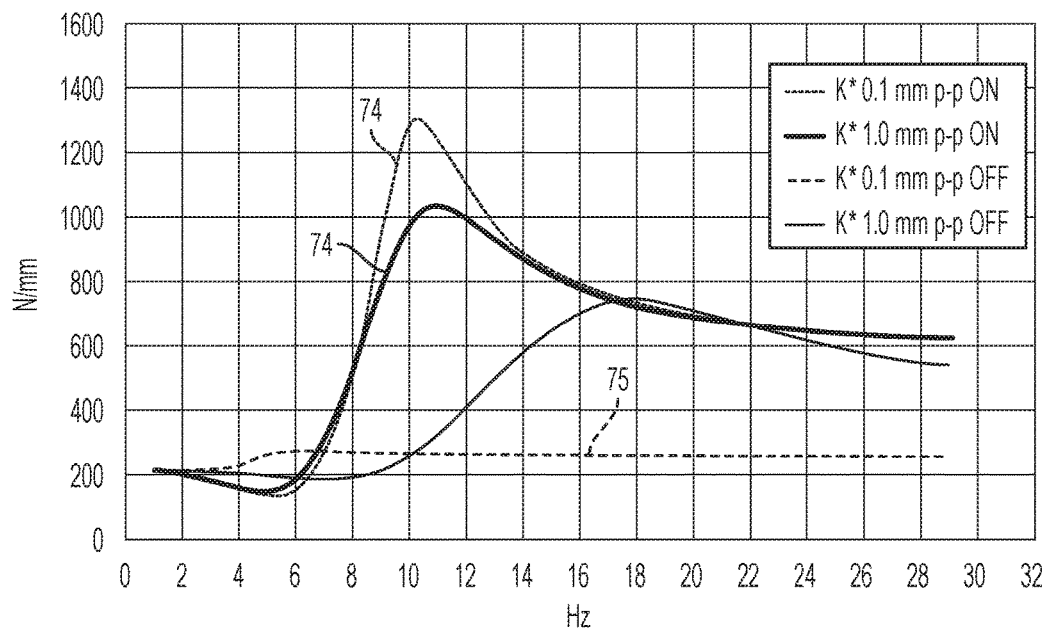
FIG. 7A is a graphical illustration of the dynamic stiffness of the switchable powertrain mount with the first embodiment of the disclosure.
Figure 7B:
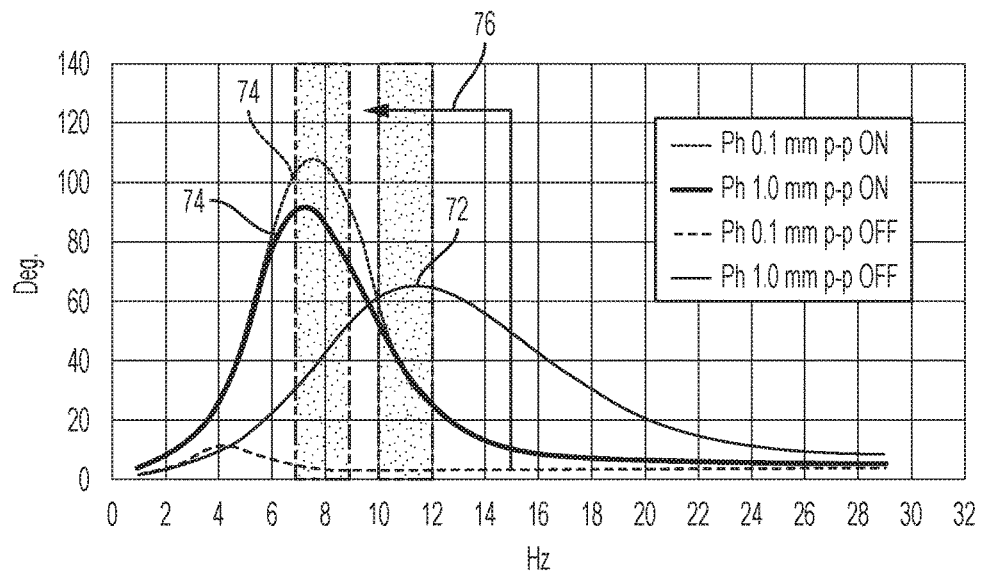
FIG. 7B is a graphical illustration of the phase angle of the switchable powertrain mount with the first embodiment of the disclosure.
Figure 8A:
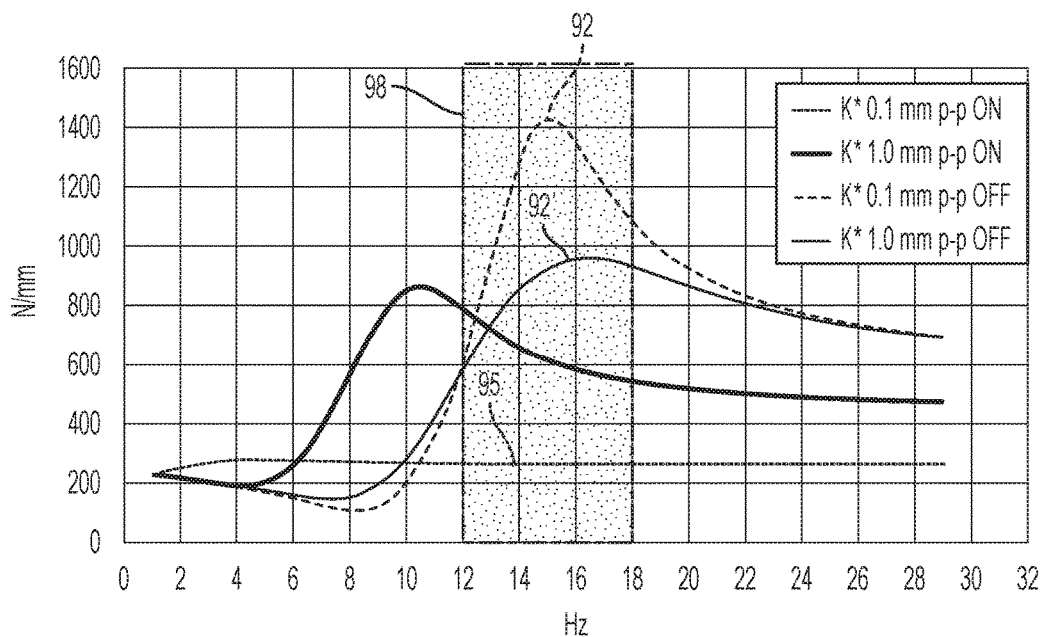
FIG. 8A is a graphical illustration of the dynamic stiffness of the switchable powertrain mount with the second embodiment of the disclosure.
Figure 8B:
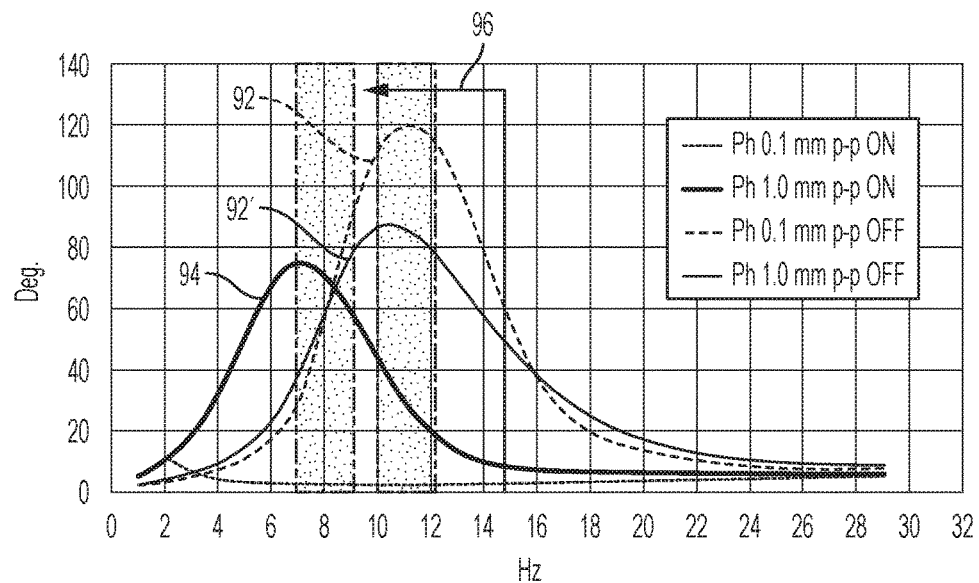
FIG. 8B is a graphical illustration of the phase angle of the switchable powertrain mount with the second embodiment of the disclosure.

FIGS. 7A-7B and 8A-8B illustrate the effect of use of the switchable powertrain mount 20 in accordance with the disclosure. FIGS. 7A and 8A illustrate a dynamic stiffness plot, showing dynamic stiffness (N/mm) at various frequencies (Hz). FIGS. 7B and 8B illustrate a phase angle plot, showing phase angle (degrees) at various frequencies (Hz). FIGS. 7A and 7B illustrate the first mechanization of the powertrain mount as shown in FIGS. 1-4 while FIGS. 8A and 8B illustrate the second mechanization of the powertrain mount as shown in FIGS. 5 and 6.

Referring to FIGS. 1 and 3, the switching apparatus 60 of the switchable powertrain mount 20 is shown in the first position or non-energized state. In the non-energized state, a controller 66 in communication with switching apparatus 60 instructs actuator 64 to move the plunger 68 to the first position such that the second channels 48, 49 are open and the decoupler air pocket 43 is vented such that the decoupler 44 is unlocked. In this non-energized state, powertrain mount 20 is configured for a low stiffness value for low displacement amplitude events or powertrain isolation events as is illustrated by line 75 in FIG. 7A and for optimal damping in high displacement amplitude road events or rough road events as is illustrated by line 72 in FIG. 7B.

Referring now to FIGS. 2 and 4, the switching apparatus 60 of the switchable powertrain mount 20 is shown in the second position or energized state. In the energized state, a controller 66 in communication with switching apparatus 60 instructs actuator 64 to synchronously position or move a first portion 69 of the least one engagement member 68 adjacent the second channel 48, 49 and a second portion 70 of the plunger 68 adjacent the air chamber 50 with the air pocket 43 and decoupler 44 to the second position.

In the second position, the first portion 69 of the plunger 68 is moved adjacent the second channel 48, 49 to close the second channel 48, 49 such that no fluid flows through the second fluid channel 48 between the first fluid chamber 38 and second fluid chamber 40. The second portion 70 of the plunger 68 is moved adjacent the air chamber 50 in the second position to seal or close the air chamber 50 such that the decoupler air pocket 43 is sealed such that the decoupler 44 is locked. It is contemplated that the first channels 46, 47 are open in the second position or energized state. In the energized state, powertrain mount 20 is configured for optimal damping in low and high displacement amplitudes or an ignition event as is illustrated by line 74 in FIG. 7B and high displacement amplitude events or rough road events as illustrated by line 72 in FIG. 7B.

Use of the switching apparatus 60 contemplates the synchronous positioning for locking and unlocking of air flow and fluid flow in the powertrain mount 20 to achieve two switchable low frequency inertia fluid tracks or channels. Compliance of the decoupler 44 may be manipulated by controlling the air pressure in the air pocket 43 between the air pocket 43 venting to the atmosphere as shown in FIGS. 1 and 3 and a sealed air pocket as shown in FIGS. 2 and 4.

Synchronous positioning and actuation of the decoupler air pocket 43 and second channel 48, 49 fluid flow allow the powertrain mount to achieve a multiple compliance arrangement. As such, low compliance of the decoupler 44 may be achieved by sealing the air pocket 43 while high compliance of the decoupler 44 may be achieved by venting the air pocket 43 to the atmosphere. It is also contemplated that the manipulation of the decoupler 44 for compliance may be achieved using a fluid over air arrangement or a fluid over fluid arrangement. The chart shown below represents the actuator state with the flow pattern through the first channels 46, 47 and second channels 48, 49 and the states of the decoupler 44 and decoupler air pocket 43.

| Actuator State | First Channel | Second Channel | Decoupler Air Pocket | Decoupler |
|---|---|---|---|---|
| First/Non-Energized | Open | Open | Vented | Unlocked |
| Second/Energized | Open | Closed | Sealed | Locked |

Referring now to FIGS. 5 and 6, a second embodiment of the switchable powertrain mount 20 of the present disclosure illustrates an alternative switching apparatus 80 for use with a second mechanization of the powertrain mount 20 of the disclosure is described in greater detail. Switching apparatus 80 is operatively connected to the housing 22 and in communication with the inertia track assembly 42. The switching apparatus 80 may be disposed in the powertrain mount 20 between the first compliant member 32 and the second compliant member 36. It is understood that the second mechanization of the powertrain mount 20 may be used with an option to provide a single channel in the inertia track assembly 42 with two channel exits as illustrated in FIGS. 3 and 4 and described above.

Switching apparatus 80 includes a housing 82 having an actuator 84 extending therefrom. Actuator 84 may be movable between a first or non-energized position as shown in FIG. 5 and a second or energized position as shown in FIG. 6. A controller 86 in communication with switching apparatus 80 instructs actuator 84 to synchronously position the plunger 88 adjacent the second channel 48 and the air chamber 50. For example, the plunger 88 may include a first portion 89 disposed adjacent the second channel 48 and a second portion 90 of the plunger 88 disposed adjacent to or within the air chamber 50 to allow venting of the air pocket 43 and decoupler 44.

In one embodiment of the disclosure, the first portion 89 of the plunger 88 may be positioned adjacent the second fluid channel 48 in the inertia track assembly 42 to close the second fluid channel 48 such that no fluid flows through the second fluid channel 48 between the first fluid chamber 38 and second fluid chamber 40. The second portion 90 of the plunger 88 may include a projection extending from the plunger 88 and move relative to the air chamber 50 to seal or vent the air pocket 43 and decoupler 44.

Referring to FIG. 5, the switching apparatus 80 of the switchable powertrain mount 20 is shown in a first position or non-energized state. In the non-energized state, a controller 86 in communication with switching apparatus 80 instructs actuator 84 to synchronously position or move the first portion 89 of the plunger 88 away from an opening in the second channel 48 such that the second channel 48 is open. The projection extending from the second portion 90 of the plunger 88 is moved adjacent an opening in the air chamber 50 to close or seal the decoupler air pocket 43 thereby locking the decoupler 44. In the first position or non-energized state, powertrain mount 20 is configured for low displacement amplitude events or smooth road events as is illustrated by line 92 in FIGS. 8A and 8B within a smooth road shake frequency range of about 12 Hz to about 18 Hz as represented by block 98 in FIG. 8A and high displacement amplitude events or rough road events as is illustrated by line 92' in FIGS. 8A and 8B.

Referring now to FIG. 6, the switching apparatus 80 of the switchable powertrain mount 20 is shown in a second position or an energized state. In the energized state, a controller 86 in communication with switching apparatus 80 instructs actuator 84 to synchronously position or move the first portion 89 of the plunger 88 adjacent the second channel 48 to close the second channel 48 such that no fluid flows through the second fluid channel 48 between the first fluid chamber 38 and second fluid chamber 40. The projection of the second portion 90 of the plunger 88 extends into the air chamber 50 to vent the air pocket 43 and unlock the decoupler 44. It is contemplated that the first channel 46 is open in both the first position or non-energized state and the second position or energized state. In the second position or energized state, powertrain mount 20 is configured for damping in high displacement amplitude events or an ignition event as is illustrated by line 94 in FIG. 8B and for a low stiffness value for low displacement amplitude events or powertrain isolation, for example in an idle or drive-away condition, as is illustrated by line 95 in FIG. 8A.

The chart shown below represents the actuator 84 state with the flow pattern through the first channel 46 and second channels 48 and the states of the decoupler 44 and decoupler air pocket 43.

| Actuator State | First Channel | Second Channel | Decoupler Air Pocket | Decoupler |
|---|---|---|---|---|
| First/Non-Energized | Open | Open | Sealed | Locked |
| Second/Energized | Open | Closed | Vented | Unlocked |

As shown herein, the powertrain mount can generate two damping peaks at distinct frequencies which can be independently tuned for ignition and ride events.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain mount for a vehicle comprising:
   a housing;
   first and second compliant members coupled to and cooperating with the housing;
   a port extending through the housing;
   an inertia track assembly disposed within the housing forming a first fluid chamber with the first compliant member and forming a second fluid chamber with the second compliant member, the inertia track assembly having at least first and second channels of different lengths extending through the inertia track assembly for conducting fluid between the first fluid chamber and the second fluid chamber, wherein the inertia track assembly forms an air chamber having a first end and a second end in communication with the port;
   a decoupler disposed in and cooperating with the first end of the air chamber; and
   a switching apparatus operatively connected to the housing and selectively positionable relative to the inertia track assembly, the switching apparatus including an actuator with a plunger synchronously positionable to open and close the second channel and air chamber of the inertia track assembly, wherein the plunger further comprises a first portion positionable relative to the second channel, a second portion positionable relative to the air chamber and a projection extending from the second portion of the plunger that is disposed within and adjustable relative to an opening in the air chamber, wherein the first portion and second portion are synchronously positionable between a first position and a second position.

2. The powertrain mount of claim 1 wherein the first and second portions of plunger are synchronously positionable between the first position wherein the first portion is moved away from the second channel to open the second channel and the second portion is moved away from the air chamber to open the air chamber and unlock the decoupler and the second position wherein the actuator is energized to move the first portion to close the second channel and the second portion closes the air chamber to lock the decoupler to force fluid through the first channel to enable two damping peaks at distinct frequencies.

3. The powertrain mount of claim 2 wherein the first portion and projection of the second portion of the plunger are synchronously positionable between the first position wherein the first portion is moved away from the second channel to open the second channel and the projection extending from the second portion closes the air chamber to lock the decoupler and the second position wherein the first portion closes the second channel and the projection extending from the second portion moves within the air chamber to open the air chamber and unlock the decoupler.

4. The powertrain mount of claim 1 wherein the switching apparatus further comprises a controller in communication with the actuator to instruct the simultaneous and selective positioning of the first portion and the second portion of the plunger between the first position and the second position.

5. The powertrain mount of claim 1 wherein the powertrain mount housing includes a first end cooperating with and receiving the first compliant member such that the first compliant member receives a propulsion system attachment assembly and a second end cooperating with the second compliant member wherein the second end of the powertrain mount housing is coupled to a vehicle structure.

6. The powertrain mount of claim 1 wherein the first and second channels in the inertia track assembly are formed as part of a single channel extending through the inertia track assembly.

7. The powertrain mount of claim 1 wherein the second fluid channel is shorter than the first fluid channel.

8. A powertrain mount for a vehicle comprising:
a housing;
first and second compliant members coupled to and cooperating with the housing;
a port extending through the housing;
an inertia track assembly disposed within the housing forming a first fluid chamber with the first compliant member and forming a second fluid chamber with the second compliant member, the inertia track assembly having at least first and second channels extending through the inertia track assembly for conducting fluid between the first fluid chamber and the second fluid chamber, wherein the inertia track assembly forms an air chamber having a first end and a second end in communication with the port;
a decoupler disposed in and cooperating with the first end of the air chamber; and
a switching apparatus operatively connected to the housing and selectively positionable relative to the inertia track assembly, the switching apparatus including an actuator and a plunger synchronously positionable to open and close the second channel and air chamber of the inertia track assembly, wherein the plunger includes a first portion positionable relative to the second channel and a second portion positionable relative to the air chamber, wherein the first portion and second portion are synchronously positionable between a first position and a second position to open and close the second channel and air chamber of the inertia track assembly,
wherein the first and second portions of the plunger are synchronously positionable between the first position wherein the first portion is moved away from the second channel to open the second channel and the second portion is moved away from the air chamber to open the air chamber and unlock the decoupler and the second position wherein the actuator is energized to move the first portion to close the second channel and the second portion closes the air chamber to lock the decoupler to force fluid through the first channel to enable two damping peaks at distinct frequencies.

9. The powertrain mount of claim 8 wherein the switching apparatus further comprises a controller in communication with the actuator to instruct the simultaneous and selective positioning of the first portion and the second portion of the plunger between the first position and the second position.

10. The powertrain mount of claim 8 wherein the powertrain mount housing includes a first end cooperating with and receiving the first compliant member such that the first compliant member receives a propulsion system attachment assembly and a second end cooperating with the second compliant member wherein the second end of the powertrain mount housing is coupled to a vehicle structure.

11. The powertrain mount of claim 8 wherein the first and second channels in the inertia track assembly are formed as part of a single channel extending through the inertia track assembly.

12. The powertrain mount of claim 8 wherein the second fluid channel is shorter than the first fluid channel.

13. The powertrain mount of claim 8 wherein the plunger further comprises a projection extending from the second portion of the plunger that is disposed within and adjustable relative to an opening in the air chamber.

14. The powertrain mount of claim 13 wherein the first portion and projection of the second portion of the plunger are synchronously positionable between the first position wherein the first portion is moved away from the second channel to open the second channel and the projection extending from the second portion closes the air chamber to lock the decoupler and the second position wherein the first portion closes the second channel and the projection extending from the second portion moves within the air chamber to open the air chamber and unlock the decoupler.

15. A powertrain mount for a vehicle comprising:
a housing;
first and second compliant members coupled to and cooperating with the housing;
a port extending through the housing;
an inertia track assembly disposed within the housing forming a first fluid chamber with the first compliant member and forming a second fluid chamber with the second compliant member, the inertia track assembly having at least first and second channels extending through the inertia track assembly for conducting fluid between the first fluid chamber and the second fluid chamber, wherein the inertia track assembly forms an air chamber having a first end and a second end in communication with the port;
a decoupler disposed in and cooperating with the first end of the air chamber; and
a switching apparatus operatively connected to the housing and selectively positionable relative to the inertia track assembly, the switching apparatus including an actuator and a plunger synchronously positionable to open and close the second channel and air chamber of the inertia track assembly,
wherein the plunger includes a first portion positionable relative to the second channel and a second portion having a projection extending from the plunger to be disposed within and adjustable relative to an opening in the air chamber, wherein the first portion and second portion are synchronously positionable between a first position and a second position to open and close the second channel and air chamber of the inertia track assembly,
wherein the first portion and projection of the second portion of the plunger are synchronously positionable between the first position wherein the first portion is moved away from the second channel to open the second channel and the projection of the second portion closes the air chamber to lock the decoupler and the second position wherein the actuator is energized to move the first portion to close the second channel and the projection of the second portion moves within the air chamber to open the air chamber and unlock the decoupler to enable two damping peaks at distinct frequencies.

16. The powertrain mount of claim 15 wherein the switching apparatus further comprises a controller in communication with the actuator to instruct the simultaneous and selective positioning of the first portion and the second portion of the plunger between the first position and the second position.

17. The powertrain mount of claim 15 wherein the first and second channels in the inertia track assembly are formed as part of a single channel extending through the inertia track assembly.

18. The powertrain mount of claim 15 wherein the second fluid channel is shorter than the first fluid channel.

* * * * *